US012767092B2

(12) United States Patent
Liu

(10) Patent No.: US 12,767,092 B2
(45) Date of Patent: Oct. 20, 2026

(54) VEHICLE CONTROL METHODS AND APPARATUSES

(71) Applicant: Alipay (Hangzhou) Information Technology Co., Ltd., Hangzhou (CN)

(72) Inventor: Fuhu Liu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 403 days.

(21) Appl. No.: 18/299,261

(22) Filed: Apr. 12, 2023

(65) Prior Publication Data

US 2023/0331188 A1 Oct. 19, 2023

(30) Foreign Application Priority Data

Apr. 19, 2022 (CN) ........................ 202210408294.6

(51) Int. Cl.
*B60R 25/24* (2013.01)

(52) U.S. Cl.
CPC .................................. *B60R 25/245* (2013.01)

(58) Field of Classification Search
CPC . B60R 25/245; B60R 25/24; B60R 2325/101; B60R 2325/205; B60R 2325/40; G07C 9/00309; G07C 2209/63
See application file for complete search history.

(56) References Cited

U.S. PATENT DOCUMENTS 11,140,157 B1 * 10/2021 Xia ..................... H04L 63/0853
2010/0075655 A1 * 3/2010 Howarter .......... H04M 1/72415
455/420
2015/0048927 A1 * 2/2015 Simmons ........... G07C 9/00309
340/5.61
2015/0235486 A1 8/2015 Ellis et al.
2017/0232933 A1 8/2017 Nishidai et al.
2019/0116556 A1 4/2019 Golsch et al.
2019/0316387 A1 10/2019 Egawa et al.
(Continued)

FOREIGN PATENT DOCUMENTS

CN 104943657 9/2015
CN 114299647 4/2022
(Continued)

OTHER PUBLICATIONS

Extended European Search Report in European Appln. No. 23168783.1, mailed on Sep. 11, 11 pages.

*Primary Examiner* — James J Yang
(74) *Attorney, Agent, or Firm* — Fish & Richardson P.C.

(57) ABSTRACT

One or more embodiments of this specification discloses vehicle control. An implementation includes performing a first control operation corresponding to a first parameter threshold on a target vehicle when it is detected that a first parameter between an electronic device and the target vehicle meets a triggering condition for the first parameter threshold corresponding to the target vehicle. A second parameter threshold corresponding to the target vehicle is adjusted from an initial threshold to a target threshold to increase a difference between the first parameter threshold and the second parameter threshold. A second control operation corresponding to the second parameter threshold on the target vehicle is performed when it is detected that the first parameter meets a triggering condition for the target threshold.

20 Claims, 8 Drawing Sheets

(56) References Cited

U.S. PATENT DOCUMENTS

| | | | |
|---|---|---|---|
| 2020/0117186 A1 | 4/2020 | Maehara et al. | |
| 2021/0009080 A1 | 1/2021 | Hu et al. | |
| 2021/0150836 A1 | 5/2021 | Fricke et al. | |

FOREIGN PATENT DOCUMENTS

| | | |
|---|---|---|
| CN | 114347948 | 4/2022 |
| DE | 102021203958 | 11/2021 |
| JP | 2002-227478 | 8/2002 |
| JP | 2004-044233 | 2/2004 |

* cited by examiner

VEHICLE CONTROL METHODS AND APPARATUSES

CROSS-REFERENCE TO RELATED APPLICATIONS

This application claims priority to Chinese Patent Application No. 202210408294.6, filed on Apr. 19, 2022, which is hereby incorporated by reference in its entirety.

TECHNICAL FIELD

This specification relates to the technical field of vehicle intelligentization, and in particular, to vehicle control methods and apparatuses.

BACKGROUND

With the development of vehicle intelligentization, a digital vehicle key technology based on a mobile phone or another wearable device is becoming mature and gradually replaces a conventional physical key. After a user installs a digital vehicle key, a vehicle control operation such as unlocking a vehicle door or opening a trunk can be performed by using an App (Application) or a mini-app of a mobile phone. A key-free access system of the conventional physical key is mature and stable and is widely applied to a plurality of vehicle systems, so that the user does not need to manually operate the key, can automatically unlock the vehicle only by carrying the key close to the vehicle, and can automatically lock the vehicle when moving away from the vehicle. With the popularity of the digital vehicle key, a Bluetooth-based vehicle control technology (such as a digital key perception-free vehicle entering technology) is being widely studied and applied to some vehicle systems by vehicle enterprises.

A frequency of a Bluetooth signal is 2.4 GHz, and a wavelength is approximately 12 cm. Due to a short wavelength of the Bluetooth signal, blocking by a human body or another object (such as clothes or pockets) may exert sudden impact on strength of the Bluetooth signal, resulting in poor accuracy in controlling the vehicle based on a Bluetooth technology. Controlling to unlock/lock the vehicle is used as an example. When the user turns back and forth at an unlocking and locking boundary or takes out a mobile phone from or puts the mobile phone into a pocket, unlocking/locking behavior of the vehicle is frequently triggered due to a change in a Bluetooth signal. However, actually, the user does not necessarily want to trigger the unlocking/locking behavior of the vehicle in this case. Therefore, intelligentization of control over the vehicle is low, and use experience of the user is affected.

SUMMARY

In one aspect, one or more embodiments of this specification provide a vehicle control method including the following: a first control operation corresponding to a first parameter threshold is performed on a target vehicle when it is detected that a first parameter between an electronic device and the target vehicle meets a triggering condition for the first parameter threshold corresponding to the target vehicle; a second parameter threshold corresponding to the target vehicle is adjusted from an initial threshold to a target threshold to increase a difference between the first parameter threshold and the second parameter threshold; and a second control operation corresponding to the second parameter threshold is performed on the target vehicle when it is detected that the first parameter meets a triggering condition for the target threshold.

In another aspect, one or more embodiments of this specification provide a vehicle control apparatus including the following: a first execution module, configured to perform a first control operation corresponding to a first parameter threshold on a target vehicle when it is detected that a first parameter between an electronic device and the target vehicle meets a triggering condition for the first parameter threshold corresponding to the target vehicle; a first adjustment module, configured to adjust a second parameter threshold corresponding to the target vehicle from an initial threshold to a target threshold to increase a difference between the first parameter threshold and the second parameter threshold; and a second execution module, configured to perform a second control operation corresponding to the second parameter threshold on the target vehicle when it is detected that the first parameter meets a triggering condition for the target threshold.

In still another aspect, one or more embodiments of this specification provide a vehicle control device including a processor and a memory electrically connected to the processor, where the memory stores a computer program, and the processor is configured to invoke the computer program from the memory and execute the computer program to implement the following: a first control operation corresponding to a first parameter threshold is performed on a target vehicle when it is detected that a first parameter between an electronic device and the target vehicle meets a triggering condition for the first parameter threshold corresponding to the target vehicle; a second parameter threshold corresponding to the target vehicle is adjusted from an initial threshold to a target threshold to increase a difference between the first parameter threshold and the second parameter threshold; and a second control operation corresponding to the second parameter threshold is performed on the target vehicle when it is detected that the first parameter meets a triggering condition for the target threshold.

In yet another aspect, some embodiments of this specification provide a storage medium for storing a computer program, where the computer program can be executed by a processor to implement the following procedure: a first control operation corresponding to a first parameter threshold is performed on a target vehicle when it is detected that a first parameter between an electronic device and the target vehicle meets a triggering condition for the first parameter threshold corresponding to the target vehicle; a second parameter threshold corresponding to the target vehicle is adjusted from an initial threshold to a target threshold to increase a difference between the first parameter threshold and the second parameter threshold; and a second control operation corresponding to the second parameter threshold is performed on the target vehicle when it is detected that the first parameter meets a triggering condition for the target threshold.

BRIEF DESCRIPTION OF DRAWINGS

To describe the technical solutions in one or more embodiments of this specification or in the existing technology more clearly, the following briefly describes the accompanying drawings needed for describing the embodiments or the existing technology. Clearly, the accompanying drawings in the following description merely show some embodiments recorded in one or more embodiments of this specification, and a person of ordinary skill in the art can still derive other drawings from these accompanying drawings without creative efforts.

DESCRIPTION OF EMBODIMENTS

One or more embodiments of this specification provide a vehicle control method and apparatus, to resolve a problem that an existing vehicle control method is low in intelligentization.

To help a person skilled in the art better understand the technical solutions in one or more embodiments of this specification, the following clearly and comprehensively describes the technical solutions in one or more embodiments of this specification with reference to the accompanying drawings in one or more embodiments of this specification. Clearly, the described embodiments are merely some but not all of the embodiments of this specification. All other embodiments obtained by a person of ordinary skill in the art based on one or more embodiments of this specification without creative efforts shall fall within the protection scope of one or more embodiments of this specification.

Figure 1:
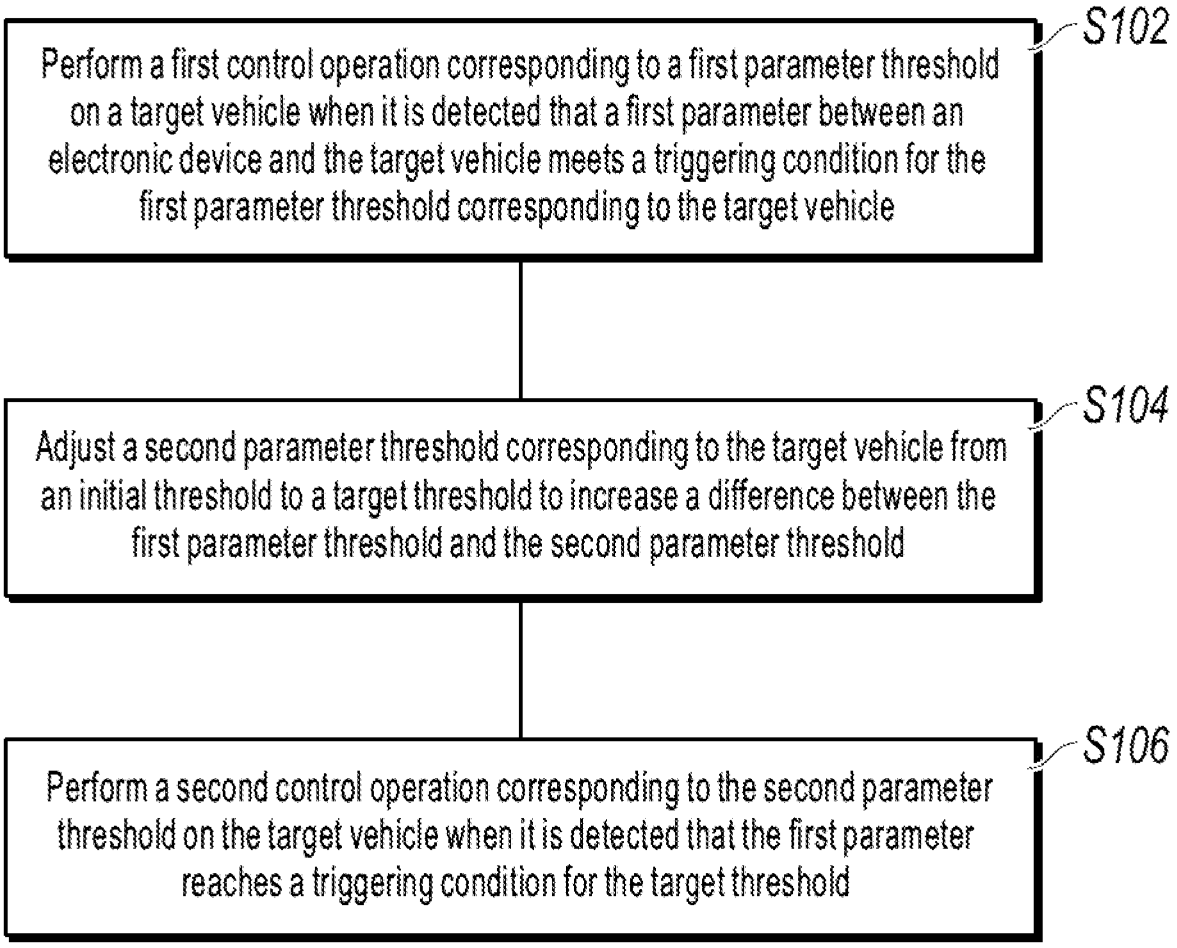
FIG. 1 is a schematic flowchart of a vehicle control method according to some embodiments of this specification.

FIG. 1 is a schematic flowchart of a vehicle control method according to some embodiments of this specification. As shown in FIG. 1, the method includes the following steps.

S102: Perform a first control operation corresponding to a first parameter threshold on a target vehicle when it is detected that a first parameter between an electronic device and the target vehicle reaches a triggering condition for the first parameter threshold corresponding to the target vehicle.

A user is usually a holder of the electronic device. Therefore, in this embodiment, the first parameter between the electronic device and the target vehicle can also be understood as a first parameter between the user holding the electronic device and the target vehicle.

S104: Adjust a second parameter threshold corresponding to the target vehicle from an initial threshold to a target threshold to increase a difference between the first parameter threshold and the second parameter threshold.

In this step, for different first parameter thresholds and different first control operations corresponding to the first parameter thresholds, there are also different methods for adjusting the second parameter threshold. The adjustment methods can include increasing or decreasing, but regardless of the adjustment method, a result obtained after the adjustment is always an increase in the difference between the first parameter threshold and the second parameter threshold. How to specifically select an adjustment method in a specific case is to be described in detail in the following embodiments.

S106: Perform a second control operation corresponding to the second parameter threshold on the target vehicle when it is detected that the first parameter reaches a triggering condition for the target threshold.

A control object of the vehicle is not limited in this embodiment. The control object can be: controlling any one or more functions of the vehicle, for example, controlling to unlock/lock the vehicle, controlling to open/close a trunk of the vehicle, or controlling to turn on/turn off vehicle lights.

The first parameter is associated with the control object of the vehicle. In an embodiment, if the vehicle is controlled to be unlocked/locked, the first parameter can be a parameter that can represent a distance between the electronic device and the vehicle, for example, a value of the distance between the electronic device and the vehicle or signal strength of short-range wireless communication between the electronic device and the vehicle. The first parameter threshold is an unlocking threshold corresponding to the first parameter. When the signal strength of the short-range wireless communication between the electronic device and the vehicle is greater than or equal to a specific threshold (that is, the first parameter threshold), unlocking of the vehicle is triggered. The second parameter threshold is a locking threshold corresponding to the first parameter. When the signal strength of the short-range wireless communication between the electronic device and the vehicle is less than a specific threshold (that is, the second parameter threshold), locking of the vehicle is triggered.

Alternatively, the first parameter threshold is a locking threshold corresponding to the first parameter. When the signal strength of the short-range wireless communication between the electronic device and the vehicle is less than a specific threshold (that is, the first parameter threshold), locking of the vehicle is triggered. The second parameter threshold is an unlocking threshold corresponding to the first parameter. When the signal strength of the short-range wireless communication between the electronic device and the vehicle is greater than or equal to a specific threshold (that is, the second parameter threshold), unlocking of the vehicle is triggered.

In the technical solutions in one or more embodiments of this specification, the first control operation corresponding to the first parameter threshold is performed on the target vehicle when it is detected that the first parameter between the electronic device and the target vehicle meets the triggering condition for the first parameter threshold corresponding to the target vehicle. Then, the second parameter threshold corresponding to the target vehicle is adjusted from the initial threshold to the target threshold to increase the difference between the first parameter threshold and the second parameter threshold, and the second control operation corresponding to the second parameter threshold is performed on the target vehicle when it is detected that the first parameter meets the triggering condition for the target threshold. It can be determined that in this technical solution, after the first control operation is performed on the target vehicle, a triggering threshold for the second control operation is increased by increasing the difference between the first parameter threshold and the second parameter threshold, and frequent triggering of the control operation (the first control operation or the second control operation) on the target vehicle when the difference between the first parameter threshold and the second parameter threshold is excessively small is avoided, thereby improving intelligentization and accuracy of control over the target vehicle.

In an embodiment, the first control operation is an unlocking operation, and the first parameter threshold is an unlocking threshold. The second control operation is a locking operation, and the second parameter threshold is a locking threshold. The locking threshold is less than the unlocking threshold. In this embodiment, if the first parameter is strength of a communication signal between the electronic device and the target vehicle, such as the signal strength of the short-range wireless communication, when the second parameter threshold corresponding to the target vehicle is adjusted from the initial threshold to the target threshold, an adjustment method is to decrease the second parameter threshold from the initial threshold to the target threshold. If the first parameter is a distance between the electronic device and the target vehicle, when the second parameter threshold corresponding to the target vehicle is adjusted from the initial threshold to the target threshold, an adjustment method is to increase the second parameter threshold from the initial threshold to the target threshold.

In an embodiment, the first control operation is a locking operation, and the first parameter threshold is a locking threshold. The second control operation is an unlocking operation, and the second parameter threshold is an unlocking threshold. The locking threshold is less than the unlocking threshold. In this embodiment, if the first parameter is the strength of the communication signal between the electronic device and the target vehicle, such as the signal strength of the short-range wireless communication, the second parameter threshold corresponding to the target vehicle is adjusted from the initial threshold to the target threshold, and an adjustment method is to increase the second parameter threshold from the initial threshold to the target threshold. If the first parameter is the distance between the electronic device and the target vehicle, when the second parameter threshold corresponding to the target vehicle is adjusted from the initial threshold to the target threshold, an adjustment method is to decrease the second parameter threshold from the initial threshold to the target threshold.

In an embodiment, the first parameter includes signal strength of short-range wireless communication between the electronic device and the target vehicle.

In an embodiment, the first parameter threshold and the second parameter threshold can be predetermined before the control operation (the first control operation or the second control operation) is performed on the target vehicle. The first parameter threshold is a first signal strength threshold, and the second parameter threshold is a second signal strength threshold.

The signal strength of the short-range wireless communication between the electronic device and the target vehicle can be used to represent the distance between the electronic device and the target vehicle. Therefore, signal strength in a case of a first predetermined distance between the electronic device and the target vehicle can be determined as the first signal strength threshold, and signal strength in a case of a second predetermined distance between the electronic device and the target vehicle is determined as the second signal strength threshold.

A magnitude relationship between the first predetermined distance and the second predetermined distance can be determined based on an application scenario. In a scenario, the first control operation is an unlocking operation, the first parameter threshold is an unlocking threshold, the second control operation is a locking operation, and the second parameter threshold is a locking threshold. In this case, the first predetermined distance needs to be less than the second predetermined distance, and the first signal strength threshold needs to be greater than the second signal strength threshold. In another scenario, the first control operation is a locking operation, the first parameter threshold is a locking threshold, the second control operation is an unlocking operation, and the second parameter threshold is an unlocking threshold. In this case, the first predetermined distance needs to be greater than the second predetermined distance, and the first signal strength threshold needs to be less than the second signal strength threshold.

In an embodiment, a short-range wireless connection between the electronic device and the target vehicle is established when it is detected that the signal strength of the short-range wireless communication between the electronic device and the target vehicle meets the triggering condition for the unlocking threshold. The short-range wireless connection between the electronic device and the target vehicle is disconnected when it is detected that the target vehicle meets the triggering condition for the locking threshold.

In an embodiment, after the second control operation corresponding to the second parameter threshold is performed on the target vehicle, the second parameter threshold can be adjusted from the target threshold to the initial threshold, to restore the second parameter threshold to the initial threshold. The second parameter threshold is readjusted after the first control operation on the target vehicle is triggered next time.

In an embodiment, the short-range wireless communication can be Bluetooth communication.

How to control unlocking/locking of the target vehicle is described below by using an example in which the first parameter is signal strength of Bluetooth communication between the electronic device and the target vehicle.

First, a principle of controlling unlocking/locking of the target vehicle based on strength of a Bluetooth signal between the electronic device and the target vehicle is described.

Figure 2:
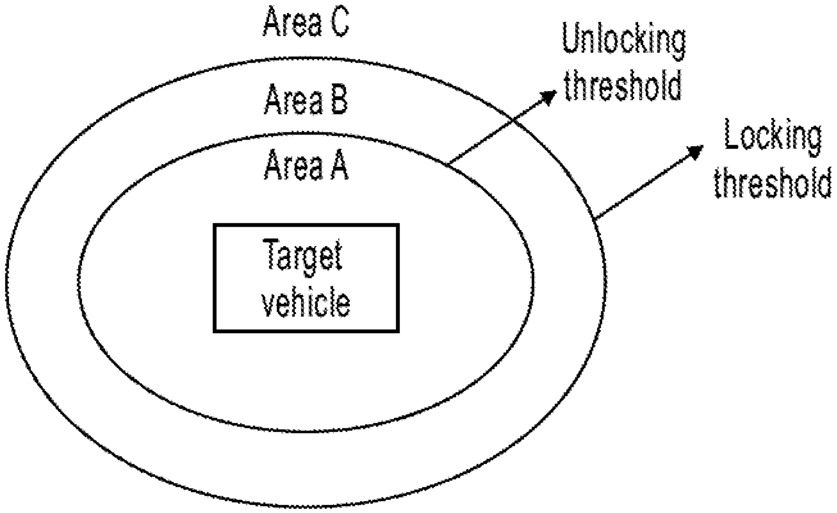
FIG. 2 is a schematic diagram of a scenario of a vehicle control method according to some embodiments of this specification.

As shown in FIG. 2, it is assumed that a surrounding area of the target vehicle is divided into three areas A, B, and C based on magnitude of the strength of the Bluetooth signal. In the figure, a larger schematic distance from the target vehicle leads to lower (or weaker) strength of the Bluetooth signal, and a smaller schematic distance from the target vehicle leads to greater (or stronger) strength of the Bluetooth signal. When a user holding the electronic device (referred to as the user for short below) arrives at the area A, the strength of the Bluetooth signal between the electronic device and the target vehicle meets the unlocking threshold, and an unlocking operation on the target vehicle is triggered. When the user arrives at the area C from the area A through the area B, the strength of the Bluetooth signal between the electronic device and the target vehicle is decreased to the locking threshold, and in this case, a locking operation on the target vehicle is triggered. No operation is performed in the area B; in other words, the area B is a critical area for the unlocking threshold and the locking threshold. It should be noted that a curve shown in FIG. 2 represents only the magnitude of the strength of the Bluetooth signal, and does not represent an actual physical distance between the user and the target vehicle.

A frequency of the Bluetooth signal is 2.4 GHz, and a wavelength is approximately 12 cm. Due to a short wavelength of the Bluetooth signal, blocking by a human body or a pocket may exert sudden impact on the strength of the Bluetooth signal. If the difference between the first parameter threshold and the second parameter threshold is excessively small, that is, a difference between the locking threshold and the unlocking threshold is excessively small, unlocking or locking is triggered frequently and incorrectly. For example, assume that the user is at the same location. When the user holds a mobile phone (that is, the electronic device) and faces the target vehicle, the unlocking operation is triggered, and when the user faces away from the target vehicle, the locking operation is triggered. Alternatively, when the mobile phone is put into the pocket, the locking operation is triggered, and when the mobile phone is taken out of the pocket, the unlocking operation is triggered.

Figure 3:
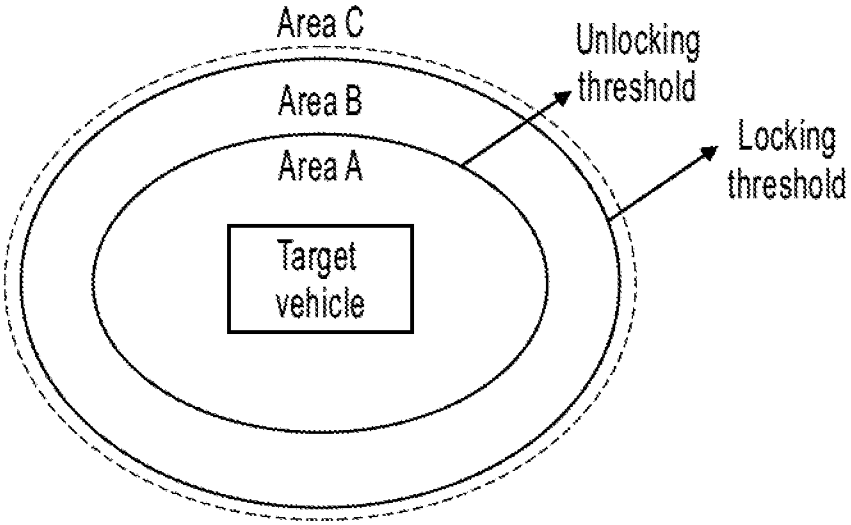
FIG. 3 is a schematic diagram of a scenario of another vehicle control method according to some embodiments of this specification.

As shown in FIG. 3, the user holds the electronic device and approaches the vehicle from the area C. When the user arrives at the area A (that is, the triggering condition for the unlocking threshold is met). In this case, the user turns around or puts the electronic device into the pocket. Due to blocking by the human body or the pocket, the strength of the Bluetooth signal suddenly deteriorates, for example, the Bluetooth signal deteriorates to a dashed line shown in FIG. 3. A vehicle computer system of the target vehicle determines, after signal processing, that the user arrives at the area C, that is, the triggering condition for the locking threshold is met, and therefore triggers the locking operation. However, the distance between the electronic device and the target vehicle remains unchanged between the unlocking operation and the locking operation.

Figure 4:
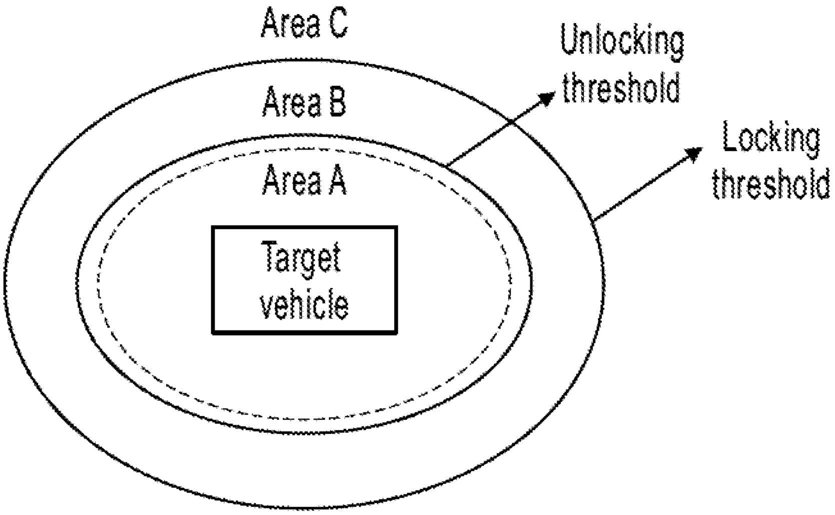
FIG. 4 is a schematic diagram of a scenario of another vehicle control method according to some embodiments of this specification.

Further, as shown in FIG. 4, it is assumed that when the user holds the electronic device and moves away from the target vehicle with his back to the target vehicle, due to blocking by the human body, the strength of the Bluetooth signal weakens. Although a distance between the user and the target vehicle is short, the vehicle computer system of the target vehicle determines, after signal processing, that the user arrives at the area C in this case, that is, the triggering condition for the locking threshold is met, and therefore triggers locking. If the user turns around, because there is no blocking from the human body, the strength of the Bluetooth signal suddenly increases, and the vehicle computer system of the target vehicle determines, after signal processing, that the user currently enters the area A, that is, the triggering condition for the unlocking threshold is met, and therefore triggers unlocking. However, the distance between the electronic device and the target vehicle remains unchanged between the locking operation and the unlocking operation.

It can be determined from the two conditions in FIG. 3 and FIG. 4 that the difference between the first parameter threshold and the second parameter threshold is small, that is, the difference between the locking threshold and the unlocking threshold is small. When the user performs an action that affects the strength of the Bluetooth signal (such as turning around) in the critical area of the two thresholds, the vehicle computer system frequently triggers locking and unlocking, thereby affecting user experience. Clearly, the difference between the first parameter threshold and the second parameter threshold needs to be increased to avoid the previous condition.

It should be noted that curves shown in FIG. 3 and FIG. 4 represent only the magnitude (or strength) of the strength of the Bluetooth signal, and do not represent an actual physical distance between the user and the target vehicle.

Figure 5:
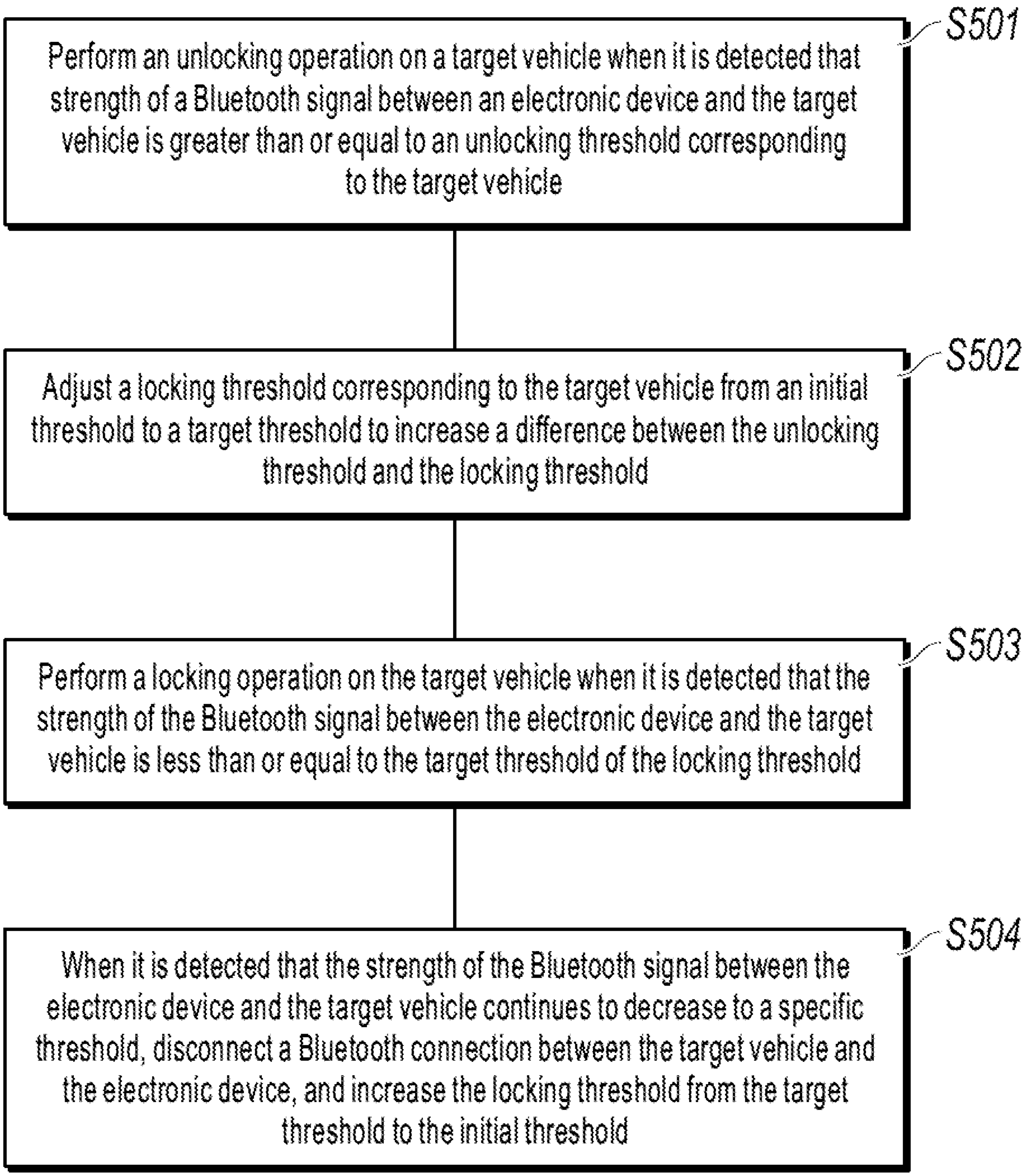
FIG. 5 is a schematic flowchart of another vehicle control method according to some embodiments of this specification.
Figure 6:
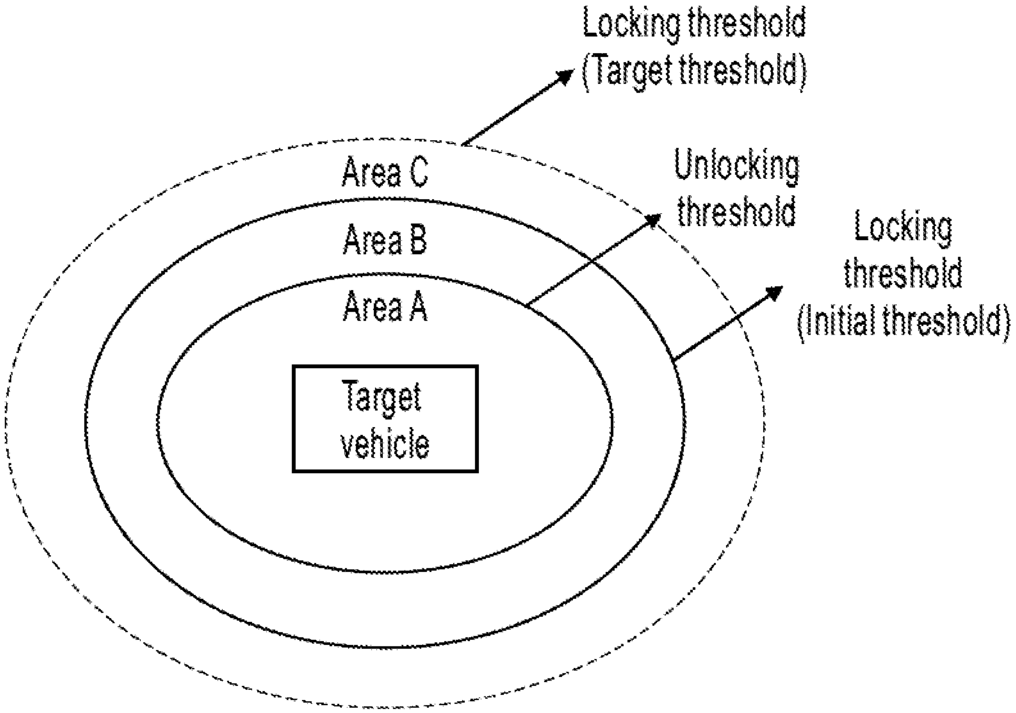
FIG. 6 is a schematic diagram of a scenario of another vehicle control method according to some embodiments of this specification.

FIG. 5 is a schematic flowchart of a vehicle control method according to some embodiments of this specification. In this embodiment, the first parameter is strength of a Bluetooth signal between the electronic device and the target vehicle. The first control operation is an unlocking operation, and the first parameter threshold is an unlocking threshold. The second control operation is a locking operation, and the second parameter threshold is a locking threshold. The locking threshold is less than the unlocking threshold. When the second parameter threshold corresponding to the target vehicle is adjusted from the initial threshold to the target threshold, an adjustment method is to decrease the second parameter threshold from the initial threshold to the target threshold. FIG. 6 is a schematic diagram of a scenario of a vehicle control method according to some embodiments of this specification, and a curve shown in FIG. 6 represents only the magnitude of the strength of the Bluetooth signal, and does not represent an actual physical distance between the user and the target vehicle. The vehicle control method in this embodiment is described below with reference to FIG. 6.

As shown in FIG. 5, the vehicle control method includes the following steps S501 to S504.

S501: Perform an unlocking operation on the target vehicle when it is detected that the strength of the Bluetooth signal between the electronic device and the target vehicle is greater than or equal to an unlocking threshold corresponding to the target vehicle.

In this step, when the strength of the Bluetooth signal is greater than or equal to the unlocking threshold corresponding to the target vehicle, it is equivalent to meeting a triggering condition corresponding to the unlocking threshold. Optionally, a Bluetooth connection between the electronic device and the target vehicle can be established when the strength of the Bluetooth signal between the electronic device and the target vehicle is greater than or equal to the unlocking threshold corresponding to the target vehicle.

As shown in FIG. 6, when a user holding the electronic device arrives at an area A around the target vehicle, a vehicle computer system of the target vehicle detects that the strength of the Bluetooth signal between the electronic device and the target vehicle is greater than or equal to the unlocking threshold corresponding to the target vehicle. In this case, the unlocking operation on the target vehicle is triggered.

S502: Adjust a locking threshold corresponding to the target vehicle from an initial threshold to a target threshold to increase a difference between the unlocking threshold and the locking threshold.

In this embodiment, the first parameter is the strength of the Bluetooth signal, and the strength of the Bluetooth signal is inversely proportional to a distance, that is, a shorter distance between the target vehicle and the electronic device leads to greater (or stronger) strength of the Bluetooth signal, and on the contrary, a longer distance between the target vehicle and the electronic device leads to lower (or weaker) strength of the Bluetooth signal. Therefore, to increase the difference between the unlocking threshold and the locking threshold, the locking threshold needs to be decreased in this case, so that the locking threshold is extended outwardly to a dashed line shown in FIG. 6.

S503: Perform a locking operation on the target vehicle when it is detected that the strength of the Bluetooth signal between the electronic device and the target vehicle is less than or equal to the target threshold of the locking threshold.

In this step, when the strength of the Bluetooth signal is less than or equal to the target threshold of the locking threshold, it is equivalent to meeting a triggering condition corresponding to the locking threshold.

S504: When it is detected that the strength of the Bluetooth signal between the electronic device and the target vehicle continues to decrease to a specific threshold, disconnect the Bluetooth connection between the target vehicle and the electronic device, and increase the locking threshold from the target threshold to the initial threshold.

In this step, when it is detected that the strength of the Bluetooth signal between the electronic device and the target vehicle continues to decrease to the specific threshold, it indicates that the user has been far away from the target vehicle. In this case, the locking threshold can be increased from the target threshold to the initial threshold, so that the locking threshold is restored inwardly to a solid line shown in FIG. 6. In this way, one round of controlling unlocking/locking of the target vehicle is completed.

It can be determined from this embodiment that, after the locking threshold is decreased from the initial threshold to the target threshold, if the user performs an action that may affect the strength of the Bluetooth signal (such as turning around) at a same location, because the difference between the locking threshold and the unlocking threshold is increased, a change in the strength of the Bluetooth signal still cannot reach the adjusted target threshold (that is, the dashed line shown in FIG. 6) of the locking threshold. Therefore, the locking operation on the target vehicle is not triggered, thereby improving intelligentization and accuracy of control over the target vehicle.

Figure 7:
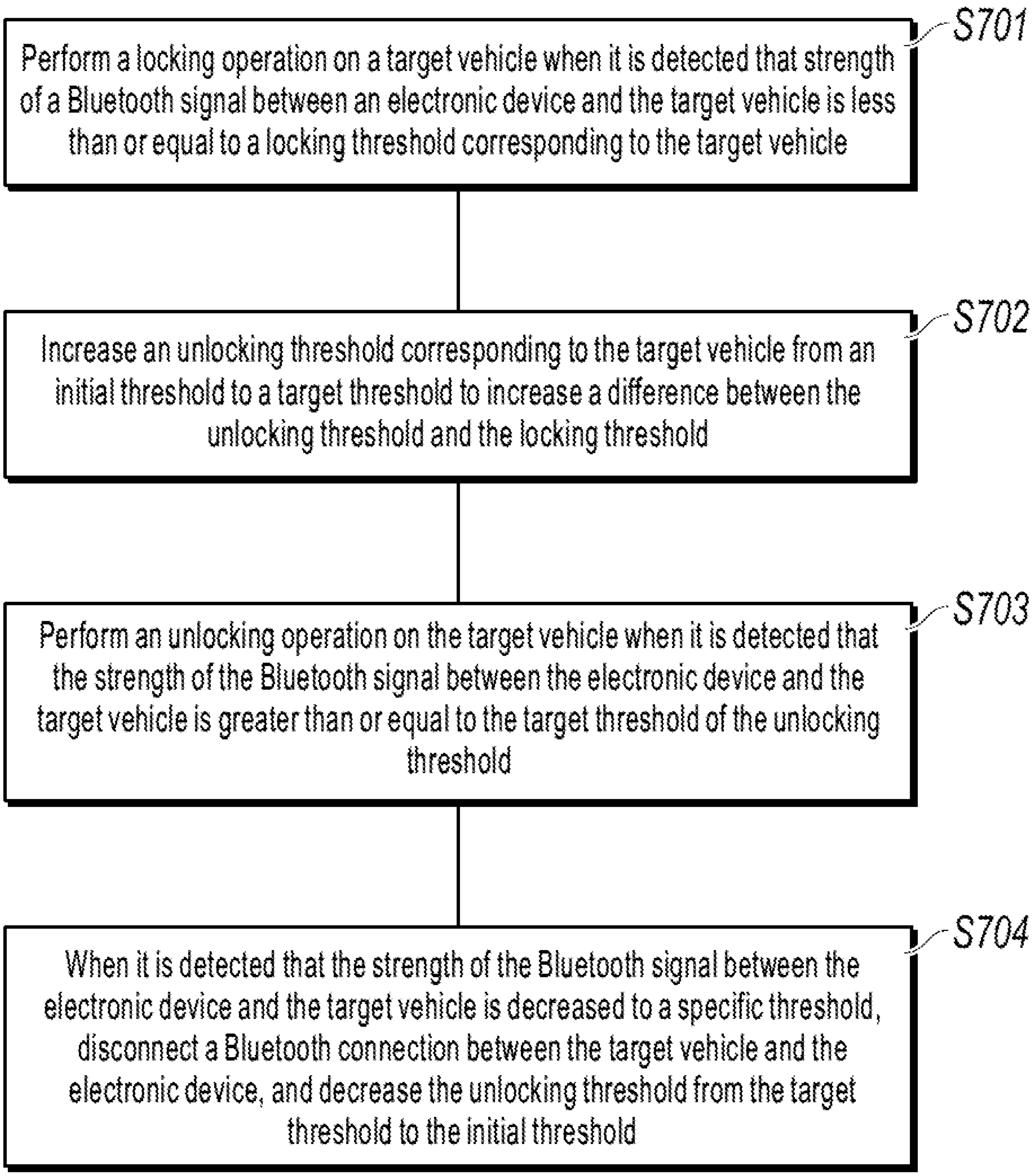
FIG. 7 is a schematic flowchart of another vehicle control method according to some embodiments of this specification.
Figure 8:
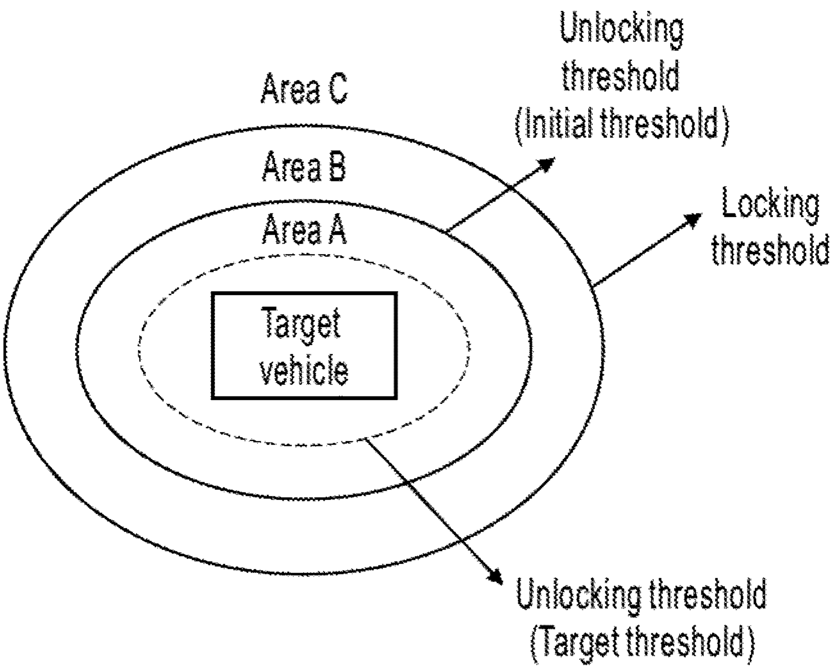
FIG. 8 is a schematic diagram of a scenario of another vehicle control method according to some embodiments of this specification.

FIG. 7 is a schematic flowchart of a vehicle control method according to some embodiments of this specification. In this embodiment, the first parameter is strength of a Bluetooth signal between the electronic device and the target vehicle. The first control operation is a locking operation, and the first parameter threshold is a locking threshold. The second control operation is an unlocking operation, and the second parameter threshold is an unlocking threshold. The locking threshold is less than the unlocking threshold. When the second parameter threshold corresponding to the target vehicle is adjusted from the initial threshold to the target threshold, the adjustment method is to increase the second parameter threshold from the initial threshold to the target threshold. FIG. 8 is a schematic diagram of a scenario of a vehicle control method according to some embodiments of this specification, and a curve shown in FIG. 8 represents only magnitude of the strength of the Bluetooth signal, and does not represent an actual physical distance between the user and the target vehicle. The vehicle control method in this embodiment is described below with reference to FIG. 8.

As shown in FIG. 7, the vehicle control method includes the following steps S701 to S704.

S701: Perform a locking operation on the target vehicle when it is detected that the strength of the Bluetooth signal between the electronic device and the target vehicle is less than or equal to a locking threshold corresponding to the target vehicle.

In this step, when the strength of the Bluetooth signal is less than or equal to the locking threshold corresponding to the target vehicle, it is equivalent to meeting a triggering condition corresponding to the locking threshold.

As shown in FIG. 8, when the user holding the electronic device arrives at an area C from an area A around the target vehicle, a vehicle computer system of the target vehicle detects that the strength of the Bluetooth signal between the electronic device and the target vehicle is less than or equal to the locking threshold corresponding to the target vehicle. In this case, the locking operation on the target vehicle is triggered.

S702: Increase an unlocking threshold corresponding to the target vehicle from an initial threshold to a target threshold to increase a difference between the unlocking threshold and the locking threshold.

In this embodiment, the first parameter is the strength of the Bluetooth signal, and the strength of the Bluetooth signal is inversely proportional to a distance, that is, a shorter distance between the target vehicle and the electronic device leads to greater (or stronger) strength of the Bluetooth signal, and on the contrary, a longer distance between the target vehicle and the electronic device leads to smaller (or weaker) strength of the Bluetooth signal. Therefore, to increase the difference between the unlocking threshold and the unlocking threshold, the unlocking threshold needs to be increased in this case, so that the unlocking threshold is decreased inwardly to a dashed line shown in FIG. 8.

S703: Perform an unlocking operation on the target vehicle when it is detected that the strength of the Bluetooth signal between the electronic device and the target vehicle is greater than or equal to the target threshold of the unlocking threshold.

In this step, when the strength of the Bluetooth signal is greater than or equal to the target threshold of the unlocking threshold, it is equivalent to meeting a triggering condition corresponding to the unlocking threshold.

If the user performs an action that may affect the strength of the Bluetooth signal (such as turning around) at a same location, because the difference between the locking threshold and the unlocking threshold is increased, a change in the strength of the Bluetooth signal still cannot reach the adjusted target threshold of the unlocking threshold (that is, the dashed line shown in FIG. 8), that is, the action performed by the user at the same location does not make the strength of the Bluetooth signal to be suddenly greater than or equal to the target threshold of the unlocking threshold. Therefore, the unlocking operation on the target vehicle is not triggered.

S704: When it is detected that the strength of the Bluetooth signal between the electronic device and the target vehicle is decreased to a specific threshold, disconnect a Bluetooth connection between the target vehicle and the electronic device, and decrease the unlocking threshold from the target threshold to the initial threshold.

In this step, when it is detected that the strength of the Bluetooth signal between the electronic device and the target vehicle is decreased to the specific threshold, it indicates that the user has been far away from the target vehicle. In this case, the unlocking threshold may be decreased from the target threshold to the initial threshold, so that the unlocking threshold is restored outwardly to a solid line shown in FIG. 8. In this way, one round of controlling unlocking/locking of the target vehicle is completed.

It can be determined from this embodiment that, after the unlocking threshold is increased from the initial threshold to the target threshold, if the user performs an action that may affect the strength of the Bluetooth signal (such as turning around) at a same location, because the difference between the locking threshold and the unlocking threshold is increased, a change in the strength of the Bluetooth signal still cannot reach the adjusted target threshold of the unlocking threshold (that is, the dashed line shown in FIG. 8), that is, the action performed by the user at the same location does not make the strength of the Bluetooth signal to be suddenly greater than or equal to the target threshold of the unlocking threshold. Therefore, the unlocking operation on the target vehicle is not triggered, thereby intelligentization and accuracy of control over the target vehicle.

It can be determined from any one of the previous embodiments that, if establishment of the Bluetooth connection to disconnection of the Bluetooth connection (that is, the distance between the electronic device and the target vehicle changes from a short distance to a long distance) is used as one unlocking/locking cycle, only one of the unlocking threshold or the locking threshold is adjusted in one unlocking/locking cycle. When the unlocking threshold is adjusted, the user moves outwardly from the area A, and the locking operation is triggered only when the strength of the Bluetooth signal reaches the dashed line shown in FIG. 8. When the locking threshold is adjusted, the user moves inwardly from the area C, and the unlocking operation is triggered only when the strength of the Bluetooth signal reaches the dashed line shown in FIG. 6. Because the difference between the unlocking threshold and the unlocking threshold is increased, a range in which the user is allowed to perform a small-range action (for example, a turning around action that may affect the strength of the Bluetooth signal) is expanded, and a condition in which the small-range action frequently triggers unlocking/locking is avoided.

In summary, specific embodiments of this subject matter have been described. Other embodiments are within the scope of the appended claims. In some cases, movements described in the claims can be performed in a different order, and desired results can still be achieved. In addition, processes depicted in the accompanying drawings do not necessarily require the particular order or sequential order shown to achieve the desired results. In some embodiments, multi-task processing and parallel processing can be advantageous.

The vehicle control method provided in one or more embodiments of this specification is described above. Based on a same idea, one or more embodiments of this specification further provided a vehicle control apparatus.

Figure 9:
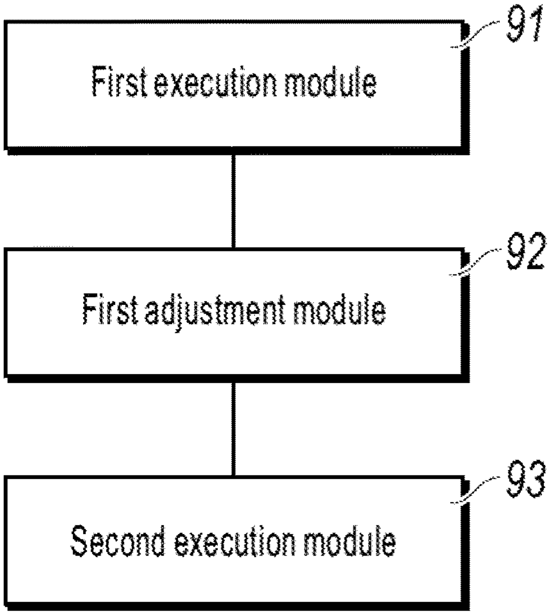
FIG. 9 is a schematic block diagram of a vehicle control apparatus according to some embodiments of this specification.

FIG. 9 is a schematic block diagram of a vehicle control apparatus according to some embodiments of this specification. As shown in FIG. 9, the vehicle control apparatus includes: a first execution module 91, configured to perform a first control operation corresponding to a first parameter threshold on a target vehicle when it is detected that a first parameter between an electronic device and the target vehicle meets a triggering condition for the first parameter threshold corresponding to the target vehicle; a first adjustment module 92, configured to adjust a second parameter threshold corresponding to the target vehicle from an initial threshold to a target threshold to increase a difference between the first parameter threshold and the second parameter threshold; and a second execution module 93, configured to perform a second control operation corresponding to the second parameter threshold on the target vehicle when it is detected that the first parameter meets a triggering condition for the target threshold.

In an embodiment, the first control operation is an unlocking operation, the first parameter threshold is an unlocking threshold, the second control operation is a locking operation, the second parameter threshold is a locking threshold, and the locking threshold is less than the unlocking threshold.

The first adjustment module 92 includes: a first adjustment unit, configured to: decrease the second parameter threshold from the initial threshold to the target threshold if the first parameter is strength of a communication signal between the electronic device and the target vehicle, and increase the second parameter threshold from the initial threshold to the target threshold if the first parameter is a distance between the electronic device and the target vehicle.

In an embodiment, the first control operation is a locking operation, the first parameter threshold is a locking threshold, the second control operation is an unlocking operation, the second parameter threshold is an unlocking threshold, and the locking threshold is less than the unlocking threshold.

The first adjustment module 92 includes: a second adjustment unit, configured to: increase the second parameter threshold from the initial threshold to the target threshold if the first parameter is strength of a communication signal between the electronic device and the target vehicle, and decrease the second parameter threshold from the initial threshold to the target threshold if the first parameter is a distance between the electronic device and the target vehicle.

In an embodiment, the first parameter includes signal strength of short-range wireless communication between the electronic device and the target vehicle.

In an embodiment, the apparatus further includes: a first determining module, configured to: when it is detected that the first parameter between the electronic device and the target vehicle meets the triggering condition for the first parameter threshold corresponding to the target vehicle, before the first control operation corresponding to the first parameter threshold is performed on the target vehicle, determine signal strength in a case of a first predetermined distance between the electronic device and the target vehicle as a first signal strength threshold, where the first parameter threshold includes the first signal strength threshold; and a second determining module, configured to determine signal strength in a case of a second predetermined distance between the electronic device and the target vehicle as a second signal strength threshold, where the second parameter threshold includes the second signal strength threshold.

In an embodiment, the apparatus further includes: an establishment module, configured to establish a short-range wireless connection between the electronic device and the target vehicle when it is detected that the signal strength meets the triggering condition for the unlocking threshold; and a disconnection module, configured to disconnect the short-range wireless connection between the electronic device and the target vehicle when it is detected that the target vehicle meets the triggering condition for the locking threshold.

In an embodiment, the apparatus further includes: a second adjustment module, configured to adjust the second parameter threshold from the target threshold to the initial threshold after the second control operation corresponding to the second parameter threshold is performed on the target vehicle.

In the apparatuses in one or more embodiments of this specification, the first control operation corresponding to the first parameter threshold is performed on the target vehicle when it is detected that the first parameter between the electronic device and the target vehicle meets the triggering condition for the first parameter threshold corresponding to the target vehicle. Then, the second parameter threshold corresponding to the target vehicle is adjusted from the initial threshold to the target threshold to increase the difference between the first parameter threshold and the second parameter threshold, and the second control operation corresponding to the second parameter threshold is performed on the target vehicle when it is detected that the first parameter meets the triggering condition for the target threshold. It can be determined that in this apparatus, after the first control operation is performed on the target vehicle, a triggering threshold for the second control operation is increased by increasing the difference between the first parameter threshold and the second parameter threshold, and frequent triggering of the control operation (the first control operation or the second control operation) on the target vehicle when the difference between the first parameter threshold and the second parameter threshold is excessively small is avoided, thereby improving intelligentization and accuracy of control over the target vehicle.

It can be understood by those skilled in the art that the previous vehicle control apparatus can be used to implement the vehicle control methods described above, and detailed descriptions of the vehicle control apparatus need to be similar to those of the method part. Details are not described herein again for simplicity.

Figure 10:
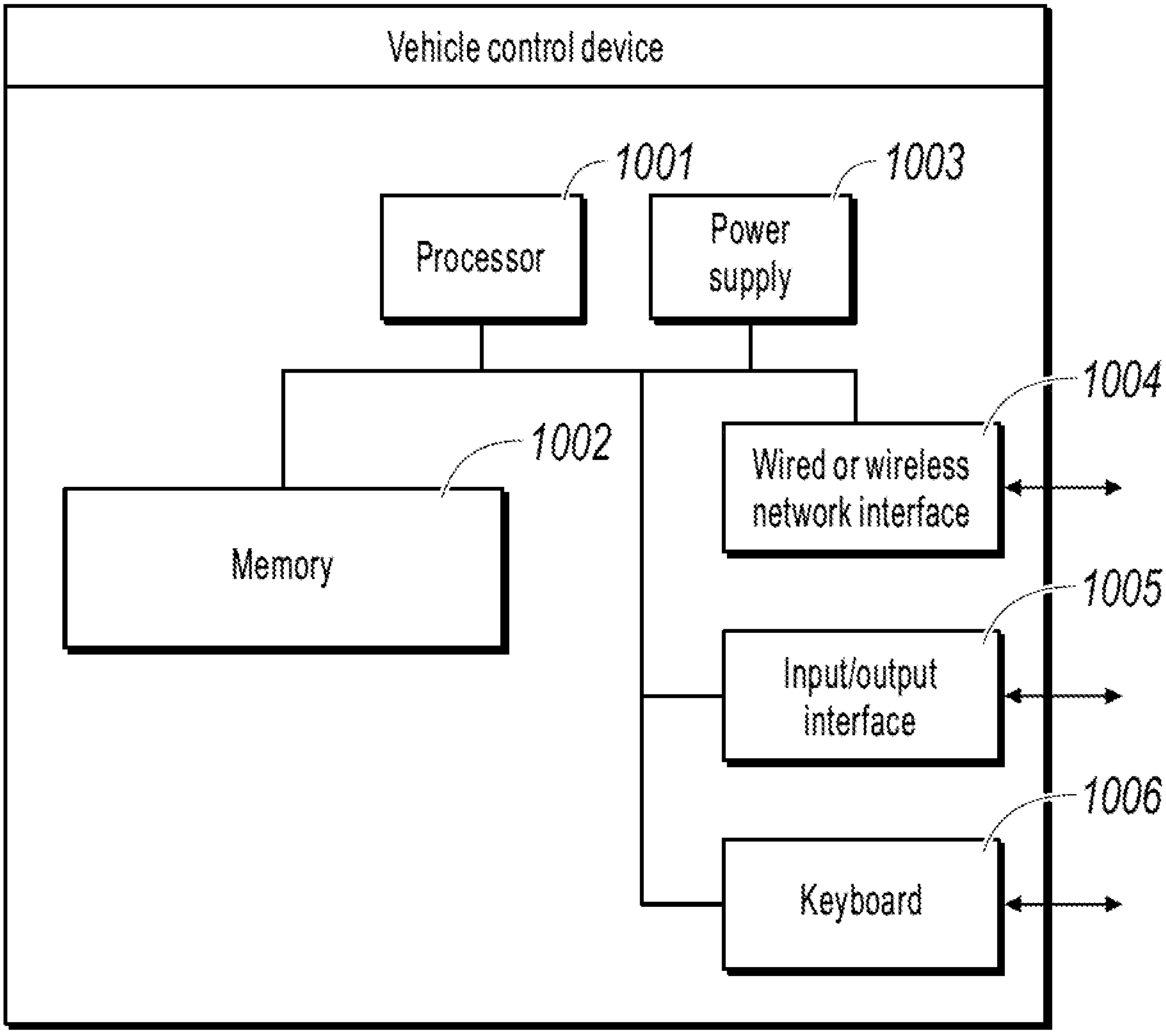
FIG. 10 is a schematic block diagram of a vehicle control device according to some embodiments of this specification.

Based on the same idea, one or more embodiments of this specification further provide a vehicle control device, as shown in FIG. 10. The vehicle control device can vary greatly due to a configuration or performance difference, and can include one or more processors 1001 and a memory 1002. The memory 1002 can store one or more storage application programs or data. The memory 1002 can be temporary storage or persistent storage. The application program stored in the memory 1002 can include one or more modules (not shown in the figure), and each module can include a series of computer-executable instructions for the vehicle control device. Even further, the processor 1001 can be configured to communicate with the memory 1002 to execute the series of computer-executable instructions in the memory 1002 on the vehicle control device. The vehicle control device can further include one or more power supplies 1003, one or more wired or wireless network interfaces 1004, one or more input/output interfaces 1005, and one or more keypads 1006.

Specifically, in this embodiment, the vehicle control device includes the memory and one or more programs. The one or more programs are stored in the memory, and the one or more programs can include one or more modules, and each module can include a series of computer-executable instructions for the vehicle control device, and is configured to execute the one or more programs by one or more processors, including computer-executable instructions for performing the following: performing a first control operation corresponding to a first parameter threshold on a target vehicle when it is detected that a first parameter between an electronic device and the target vehicle meets a triggering condition for the first parameter threshold corresponding to the target vehicle; adjusting a second parameter threshold corresponding to the target vehicle from an initial threshold to a target threshold to increase a difference between the first parameter threshold and the second parameter threshold; and performing a second control operation corresponding to the second parameter threshold on the target vehicle when it is detected that the first parameter meets a triggering condition for the target threshold.

In the technical solutions in one or more embodiments of this specification, the first control operation corresponding to the first parameter threshold is performed on the target vehicle when it is detected that the first parameter between the electronic device and the target vehicle meets the triggering condition for the first parameter threshold corresponding to the target vehicle. Then, the second parameter threshold corresponding to the target vehicle is adjusted from the initial threshold to the target threshold to increase the difference between the first parameter threshold and the second parameter threshold, and the second control operation corresponding to the second parameter threshold is performed on the target vehicle when it is detected that the first parameter meets the triggering condition for the target threshold. It can be determined that in this technical solution, after the first control operation is performed on the target vehicle, a triggering threshold for the second control operation is increased by increasing the difference between the first parameter threshold and the second parameter threshold, and frequent triggering of the control operation (the first control operation or the second control operation) on the target vehicle when the difference between the first parameter threshold and the second parameter threshold is excessively small is avoided, thereby improving intelligentization and accuracy of control over the target vehicle.

One or more embodiments of this specification further provide a storage medium storing one or more computer programs, the one or more computer programs include instructions, and when the instructions are executed by an electronic device including a plurality of application programs, the electronic device can be enabled to perform various processes of the previous vehicle control method embodiments, and is specifically configured to perform the following: performing a first control operation corresponding to a first parameter threshold on a target vehicle when it is detected that a first parameter between an electronic device and the target vehicle meets a triggering condition for the first parameter threshold corresponding to the target vehicle; adjusting a second parameter threshold corresponding to the target vehicle from an initial threshold to a target threshold to increase a difference between the first parameter threshold and the second parameter threshold; and performing a second control operation corresponding to the second parameter threshold on the target vehicle when it is detected that the first parameter meets a triggering condition for the target threshold.

In the technical solutions in one or more embodiments of this specification, the first control operation corresponding to the first parameter threshold is performed on the target vehicle when it is detected that the first parameter between the electronic device and the target vehicle meets the triggering condition for the first parameter threshold corresponding to the target vehicle. Then, the second parameter threshold corresponding to the target vehicle is adjusted from the initial threshold to the target threshold to increase the difference between the first parameter threshold and the second parameter threshold, and the second control operation corresponding to the second parameter threshold is performed on the target vehicle when it is detected that the first parameter meets the triggering condition for the target threshold. It can be determined that in this technical solution, after the first control operation is performed on the target vehicle, a triggering threshold for the second control operation is increased by increasing the difference between the first parameter threshold and the second parameter threshold, and frequent triggering of the control operation (the first control operation or the second control operation) on the target vehicle when the difference between the first parameter threshold and the second parameter threshold is excessively small is avoided, thereby improving intelligentization and accuracy of control over the target vehicle.

Systems, apparatuses, modules, or units that are set forth in the previous embodiments can be embodied by a computer chip or an entity or by a product with a specific function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or any combination of these devices.

For ease of description, the previous apparatus is described by dividing functions into various units. Certainly, when one or more embodiments of this specification are implemented, a function of each unit can be implemented in one or more pieces of software and/or hardware.

A person skilled in the art should understand that one or more embodiments of this specification can be provided as methods, systems, or computer program products. Therefore, one or more embodiments of this specification can use a form of hardware only embodiments, software only embodiments, or embodiments with a combination of software and hardware. Moreover, one or more embodiments of this specification can use a form of a computer program product that is implemented on one or more computer-usable storage media (including but not limited to a disk memory, a CD-ROM, an optical memory, etc.) that include computer-usable program code.

One or more embodiments of this specification are described with reference to the flowcharts and/or block diagrams of the method, the device (system), and the computer program product based on the embodiments of this specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of other programmable data processing devices generate a device for implementing a specific function in one or more processes in the flowcharts and/or in one or more blocks in the block diagrams.

These computer program instructions can be stored in a computer-readable memory that can instruct the computer or other programmable data processing devices to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or other programmable devices, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computing device includes one or more processors (CPU), an input/output interface, a network interface, and a memory.

The memory may include a non-persistent memory, a random access memory (RAM), a non-volatile memory, and/or another form that are in a computer readable medium, for example, a read-only memory (ROM) or a flash memory (flash RAM). The memory is an example of the computer-readable medium.

The computer-readable medium includes permanent and non-permanent, removable and non-removable media, and can store information by using any method or technology. The information can be a computer-readable instruction, a data structure, a program module, or other data. Examples of a computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. As described in this specification, the computer-readable medium does not include transitory computer-readable media (transitory media) such as a modulated data signal and a carrier.

It is worthwhile to further note that, the terms "include", "comprise", or their any other variants are intended to cover a non-exclusive inclusion, so a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

One or more embodiments of this specification can be described in the general context of computer-executable instructions, for example, a program module. Generally, the program module includes a routine, a program, an object, a component, a data structure, etc. executing a specific task or implementing a specific abstract data type. This specification can alternatively be practiced in distributed computing environments in which tasks are performed by remote processing devices that are connected through a communication network. In the distributed computing environment, the program module can be located in both local and remote computer storage media including storage devices.

The embodiments in this specification are described in a progressive way. For same or similar parts of the embodiments, mutual references can be made to the embodiments. Each embodiment focuses on a difference from other embodiments. Particularly, a system embodiment is similar to a method embodiment, and therefore is described briefly. For related parts, references can be made to related descriptions in the method embodiment.

The previous descriptions are merely one or more embodiments of this specification and are not intended for limiting this specification. A person skilled in the art knows that one or more embodiments of this specification can have various modifications and changes. Any modifications, equivalent replacements, and improvements made within the spirit and principle of one or more embodiments of this specification shall fall within the scope of the claims in one or more embodiments of this specification.

What is claimed is:

1. A computer-implemented method for vehicle control, comprising:

performing a first control operation corresponding to a first parameter threshold on a target vehicle when it is detected that a first parameter between an electronic device and the target vehicle meets a triggering condition for the first parameter threshold corresponding to the target vehicle;

in response to performing the first control operation, automatically adjusting a second parameter threshold corresponding to the first parameter from an initial threshold to a target threshold to increase a difference between the first parameter threshold and the second parameter threshold;

performing a second control operation corresponding to the second parameter threshold on the target vehicle when it is detected that the first parameter meets a triggering condition for the target threshold;

after performing the second control operation, determining that the first parameter meets a triggering condition for adjusting the second parameter threshold; and in response to determining that the first parameter meets the triggering condition for adjusting the second parameter threshold, automatically adjusting the second parameter threshold from the target threshold back to the initial threshold.

2. The computer-implemented method of claim 1, wherein:

the first control operation is an unlocking operation, wherein the first parameter threshold is an unlocking threshold, wherein the second control operation is a locking operation, and wherein the second parameter threshold is a locking threshold; and the adjusting a second parameter threshold corresponding to the target vehicle from an initial threshold to a target threshold, comprises:

decreasing the second parameter threshold from the initial threshold to the target threshold if the first parameter is strength of a communication signal between the electronic device and the target vehicle; and increasing the second parameter threshold from the initial threshold to the target threshold if the first parameter is a distance between the electronic device and the target vehicle.

3. The computer-implemented method of claim 1, wherein:

the first control operation is a locking operation, wherein the first parameter threshold is a locking threshold, and wherein the second control operation is an unlocking operation, wherein the second parameter threshold is an unlocking threshold; and the adjusting a second parameter threshold corresponding to the target vehicle from an initial threshold to a target threshold, comprises:

increasing the second parameter threshold from the initial threshold to the target threshold if the first parameter is strength of a communication signal between the electronic device and the target vehicle; and decreasing the second parameter threshold from the initial threshold to the target threshold if the first parameter is a distance between the electronic device and the target vehicle.

4. The computer-implemented method of claim 2, wherein the first parameter comprises signal strength of short-range wireless communication between the electronic device and the target vehicle.

5. The computer-implemented method of claim 4, wherein, before performing a first control operation corresponding to a first parameter threshold on a target vehicle when it is detected that a first parameter between an electronic device and the target vehicle meets a triggering condition for the first parameter threshold corresponding to the target vehicle, comprising:

determining signal strength in a case of a first predetermined distance between the electronic device and the target vehicle as first signal strength threshold, wherein the first parameter threshold comprises the first signal strength threshold; and determining signal strength in a case of a second predetermined distance between the electronic device and the target vehicle as a second signal strength threshold, wherein the second parameter threshold comprises the second signal strength threshold.

6. The computer-implemented method according claim 5, comprising:

establishing a short-range wireless connection between the electronic device and the target vehicle when it is detected that the signal strength meets a triggering condition for the unlocking threshold; and disconnecting the short-range wireless connection between the electronic device and the target vehicle when it is detected that the target vehicle meets a triggering condition for the locking threshold.

7. A non-transitory, computer-readable medium storing one or more instructions executable by a computer system to perform operations, comprising:

performing a first control operation corresponding to a first parameter threshold on a target vehicle when it is detected that a first parameter between an electronic device and the target vehicle meets a triggering condition for the first parameter threshold corresponding to the target vehicle;

in response to performing the first control operation, automatically adjusting a second parameter threshold corresponding to the first parameter from an initial threshold to a target threshold to increase a difference between the first parameter threshold and the second parameter threshold;

performing a second control operation corresponding to the second parameter threshold on the target vehicle when it is detected that the first parameter meets a triggering condition for the target threshold;

after performing the second control operation, determining that the first parameter meets a triggering condition for adjusting the second parameter threshold; and in response to determining that the first parameter meets the triggering condition for adjusting the second parameter threshold, automatically adjusting the second parameter threshold from the target threshold back to the initial threshold.

8. The non-transitory, computer-readable medium of claim 7, wherein:

the first control operation is an unlocking operation, wherein the first parameter threshold is an unlocking threshold, and wherein the second control operation is a locking operation, wherein the second parameter threshold is a locking threshold; and the adjusting a second parameter threshold corresponding to the target vehicle from an initial threshold to a target threshold, comprises:

decreasing the second parameter threshold from the initial threshold to the target threshold if the first parameter is strength of a communication signal between the electronic device and the target vehicle; and increasing the second parameter threshold from the initial threshold to the target threshold if the first parameter is a distance between the electronic device and the target vehicle.

9. The non-transitory, computer-readable medium of claim 7, wherein:

the first control operation is a locking operation, wherein the first parameter threshold is a locking threshold, wherein the second control operation is an unlocking operation, and wherein the second parameter threshold is an unlocking threshold; and the adjusting a second parameter threshold corresponding to the target vehicle from an initial threshold to a target threshold, comprises:

increasing the second parameter threshold from the initial threshold to the target threshold if the first parameter is strength of a communication signal between the electronic device and the target vehicle; and decreasing the second parameter threshold from the initial threshold to the target threshold if the first parameter is a distance between the electronic device and the target vehicle.

10. The non-transitory, computer-readable medium of claim 8, wherein the first parameter comprises signal strength of short-range wireless communication between the electronic device and the target vehicle.

11. The non-transitory, computer-readable medium of claim 10, wherein, before performing a first control operation corresponding to a first parameter threshold on a target vehicle when it is detected that a first parameter between an electronic device and the target vehicle meets a triggering condition for the first parameter threshold corresponding to the target vehicle, comprising:

determining signal strength in a case of a first predetermined distance between the electronic device and the target vehicle as first signal strength threshold, wherein the first parameter threshold comprises the first signal strength threshold; and determining signal strength in a case of a second predetermined distance between the electronic device and the target vehicle as a second signal strength threshold, wherein the second parameter threshold comprises the second signal strength threshold.

12. The non-transitory, computer-readable medium according claim 11, comprising:

establishing a short-range wireless connection between the electronic device and the target vehicle when it is detected that the signal strength meets a triggering condition for the unlocking threshold; and disconnecting the short-range wireless connection between the electronic device and the target vehicle when it is detected that the target vehicle meets a triggering condition for the locking threshold.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

performing a first control operation corresponding to a first parameter threshold on a target vehicle when it is detected that a first parameter between an electronic device and the target vehicle meets a triggering condition for the first parameter threshold corresponding to the target vehicle;

in response to performing the first control operation, automatically adjusting a second parameter threshold corresponding to the first parameter from an initial threshold to a target threshold to increase a difference between the first parameter threshold and the second parameter threshold;

performing a second control operation corresponding to the second parameter threshold on the target vehicle when it is detected that the first parameter meets a triggering condition for the target threshold;

after performing the second control operation, determining that the first parameter meets a triggering condition for adjusting the second parameter threshold; and in response to determining that the first parameter meets the triggering condition for adjusting the second parameter threshold, automatically adjusting the second parameter threshold from the target threshold back to the initial threshold.

14. The computer-implemented system of claim 13, wherein:

the first control operation is an unlocking operation, wherein the first parameter threshold is an unlocking threshold, wherein the second control operation is a locking operation, and wherein the second parameter threshold is a locking threshold; and the adjusting a second parameter threshold corresponding to the target vehicle from an initial threshold to a target threshold, comprises:

decreasing the second parameter threshold from the initial threshold to the target threshold if the first parameter is strength of a communication signal between the electronic device and the target vehicle; and increasing the second parameter threshold from the initial threshold to the target threshold if the first parameter is a distance between the electronic device and the target vehicle.

15. The computer-implemented system of claim 13., wherein:

the first control operation is a locking operation, wherein the first parameter threshold is a locking threshold, wherein the second control operation is an unlocking operation, and wherein the second parameter threshold is an unlocking threshold; and the adjusting a second parameter threshold corresponding to the target vehicle from an initial threshold to a target threshold, comprises:

increasing the second parameter threshold from the initial threshold to the target threshold if the first parameter is strength of a communication signal between the electronic device and the target vehicle; and decreasing the second parameter threshold from the initial threshold to the target threshold if the first parameter is a distance between the electronic device and the target vehicle.

16. The computer-implemented system of claim 14, wherein the first parameter comprises signal strength of short-range wireless communication between the electronic device and the target vehicle.

17. The computer-implemented system of claim 16, wherein, before performing a first control operation corresponding to a first parameter threshold on a target vehicle when it is detected that a first parameter between an electronic device and the target vehicle meets a triggering condition for the first parameter threshold corresponding to the target vehicle, comprising:

determining signal strength in a case of a first predetermined distance between the electronic device and the target vehicle as first signal strength threshold, wherein the first parameter threshold comprises the first signal strength threshold; and determining signal strength in a case of a second predetermined distance between the electronic device and the target vehicle as a second signal strength threshold, wherein the second parameter threshold comprises the second signal strength threshold.

18. The computer-implemented system according claim 17, comprising:

establishing a short-range wireless connection between the electronic device and the target vehicle when it is detected that the signal strength meets a triggering condition for the unlocking threshold; and disconnecting the short-range wireless connection between the electronic device and the target vehicle when it is detected that the target vehicle meets a triggering condition for the locking threshold.

19. The computer-implemented method of claim 1, wherein the first parameter comprises a signal strength of short-range wireless communication between the electronic device and the target vehicle, and wherein determining that the first parameter meets the triggering condition for adjusting the second parameter threshold comprises:

determining that the signal strength meets a signal strength threshold.

20. The non-transitory, computer-readable medium of claim 7, wherein the first parameter comprises a signal strength of short-range wireless communication between the electronic device and the target vehicle, and wherein determining that the first parameter meets the triggering condition for adjusting the second parameter threshold comprises:

determining that the signal strength meets a signal strength threshold.

* * * * *